(12) United States Patent
Shim et al.

(10) Patent No.: US 11,034,230 B1
(45) Date of Patent: Jun. 15, 2021

(54) POWER TRANSMISSION APPARATUS OF HYBRID ELECTRIC VEHICLE

(71) Applicants: Hyundai Motor Company, Seoul (KR); Kia Motors Corporation, Seoul (KR)

(72) Inventors: Hyu Tae Shim, Hwaseong-Si (KR); Bong Hyun Cho, Gunpo-Si (KR); Jae Young Jeon, Osan-Si (KR); Byung Dae Choi, Seoul (KR); Hyung-Min Kim, Suwon-Si (KR); Jin Yong Kim, Incheon (KR); Gwang Soo Hwang, Hwaseong-Si (KR); Jun Seong Kang, Gwacheon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/842,520

(22) Filed: Apr. 7, 2020

(30) Foreign Application Priority Data

Dec. 11, 2019 (KR) .......................... 10-2019-0164615

(51) Int. Cl.
*B60K 6/365* (2007.10)
*F16H 3/72* (2006.01)
(Continued)

(52) U.S. Cl.
CPC .............. *B60K 6/365* (2013.01); *B60K 6/547* (2013.01); *F16H 3/724* (2013.01); *B60K 6/442* (2013.01); *B60K 6/543* (2013.01); *B60Y 2200/92* (2013.01); *F16H 3/725* (2013.01); *F16H 2200/0021* (2013.01); *F16H 2200/0065* (2013.01); *F16H 2200/2007* (2013.01); *F16H 2200/2043* (2013.01); *F16H 2200/2082* (2013.01)

(58) Field of Classification Search
None
See application file for complete search history.

(56) References Cited

U.S. PATENT DOCUMENTS 7,169,074 B2 * 1/2007 Raghavan .............. B60K 6/445
475/5
7,172,525 B2 * 2/2007 Sowul ..................... F16H 3/728
475/5

(Continued)

*Primary Examiner* — Dirk Wright
(74) *Attorney, Agent, or Firm* — Morgan, Lewis & Bockius LLP (57) ABSTRACT

A power transmission apparatus for a hybrid electric vehicle may include an input shaft receiving an engine torque, first and second planetary gear sets respectively having first to third rotation elements fourth to sixth rotation elements, a first shaft fixedly connected to the first rotation element and the motor-generator and selectively connectable to the input shaft, a second shaft fixedly connected to the second and sixth rotation elements and selectively connectable to the input shaft, a third shaft fixedly connected to the third rotation element and selectively connectable to the transmission housing, a fourth shaft fixedly connected to the fourth rotation element and selectively connectable to the transmission housing, a fifth shaft fixedly connecting the fifth rotation element and an output gear and selectively connectable to the third shaft, and a plurality of engagement elements including at least one clutch and at least one brake.

11 Claims, 8 Drawing Sheets

(51) Int. Cl.
*B60K 6/547* (2007.10)
*B60K 6/543* (2007.10)
*B60K 6/442* (2007.10)

(56) References Cited

U.S. PATENT DOCUMENTS

| | | | | |
|---|---|---|---|---|
| 7,192,373 | B2 * | 3/2007 | Bucknor | B60L 50/16 |
| | | | | 475/5 |
| 7,220,202 | B2 * | 5/2007 | Singh | B60K 6/365 |
| | | | | 475/5 |
| 7,220,203 | B2 * | 5/2007 | Holmes | B60K 6/48 |
| | | | | 475/5 |
| 7,252,611 | B2 * | 8/2007 | Raghavan | B60K 6/365 |
| | | | | 475/5 |
| 7,273,435 | B2 * | 9/2007 | Raghavan | B60K 6/365 |
| | | | | 475/151 |
| 7,422,535 | B2 * | 9/2008 | Raghavan | F16H 3/728 |
| | | | | 475/5 |
| 7,473,199 | B2 * | 1/2009 | Bucknor | F16H 3/728 |
| | | | | 475/5 |
| 7,931,555 | B2 * | 4/2011 | Iwanaka | B60W 10/115 |
| | | | | 475/5 |
| 7,998,016 | B2 * | 8/2011 | Si | B60K 6/445 |
| | | | | 475/284 |
| 8,597,146 | B2 * | 12/2013 | Holmes | F16H 3/728 |
| | | | | 475/5 |

* cited by examiner

| Category | | Engagement element | | | | |
|---|---|---|---|---|---|---|
| | | C1 | C2 | C3 | B1 | B2 |
| Engine mode (parallel hybrid mode) | 1st | ● | | | ● | ● |
| | 2nd | ● | ● | | ● | |
| | 3rd | ● | | ● | ● | |
| | 4th | ● | ● | ● | | |
| eCVT mode | OD | | ● | ● | | |
| EV mode | 1st | | | | ● | ● |
| | 2nd | | ● | | ● | |
| | 3rd | ● | | ● | ● | |
| | 4th | ● | ● | ● | | |
| Recharging mode (vehicle stopped) | | ● | | | | |

| Category | | Engagement element | | | | | |
|---|---|---|---|---|---|---|---|
| | | C1 | C2 | C3 | B1 | B2 | (OWC) |
| Engine mode (parallel hybrid mode) | 1st | ● | | | ● | ● | ● |
| | 2nd | ● | ● | | ● | | ● |
| | 3rd | ● | | ● | ● | | ● |
| | 4th | ● | ● | ● | | | ● |
| eCVT mode | OD | | ● | ● | | | ● |
| EV mode | 1st | | | | ● | ● | |
| | 2nd | | ● | | ● | | |
| | 3rd | ● | | ● | ● | | |
| | 4th | ● | ● | ● | | | |
| Recharging mode (vehicle stopped) | | ● | | | | | ● |

POWER TRANSMISSION APPARATUS OF HYBRID ELECTRIC VEHICLE

CROSS-REFERENCE TO RELATED APPLICATION

The present application claims priority to Korean Patent Application No. 10-2019-0164615 filed on Dec. 11, 2019, the entire contents of which is incorporated herein for all purposes by this reference.

BACKGROUND OF THE INVENTION

Field of the Invention

The present invention relates to a power transmission apparatus of a hybrid electric vehicle.

Description of Related Art

An environment-friendly technology of a vehicle is a core technology which controls survival of a future vehicle industry, and advanced vehicle makers have focused their energy on the development of an environment-friendly vehicle to achieve environmental and fuel efficiency regulations.

Therefore, vehicle makers have developed an electric vehicle (EV), a hybrid electric vehicle (HEV), a fuel cell electric vehicle (FCEV), and the like, as future vehicle technologies.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the conventional fossil fuel and a motor-generator driven by electrical energy are mixed and used as the power sources.

In the hybrid electric vehicle, an EV mode in which the hybrid electric vehicle is driven by only the motor, an HEV mode using both the engine and the motor, and an ENG mode using only the engine may be implemented according to the combination of the engine and the motor. Furthermore, the hybrid electric vehicle can provide a significant improvement of fuel efficiency through an idle stop function of stopping the engine when the vehicle stops, and also through a regenerative braking, where a motor-generator is driven as a generator to generate electricity by a kinetic energy of the vehicle under a braking situation, such generated electricity is stored in a battery, and the stored electricity is reused in driving the vehicle.

A transmission for hybrid electric vehicle performs shifting operation based on torques of the engine and the motor-generator. Such a transmission may realize multi-speed, e.g., six speeds, of various modes by additionally employing an engine clutch to be variably connected to the engine to a traditional multi-speed, e.g., six-speed, automatic transmission.

Such a transmission for a hybrid electric vehicle may typically include three planetary gear sets, six operational elements, and at least one one-way clutch OWC, similarly to a conventional six-speed automatic transmission, as well as the additional engine clutch. By such a scheme, the transmission for a hybrid electric vehicle may not be understood to be best optimized for a hybrid electric vehicle, and may be improved to provide better efficiency, better performance, and better fuel consumption, or less production cost.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission apparatus of a hybrid electric vehicle having advantages of, while simplifying the structure of a transmission, realizing various shifting modes, such as an engine mode and a parallel hybrid mode respectively having multiple speeds, an electronically-controlled continuously variable shifting mode (eCVT mode), and an electric vehicle mode (EV mode), reducing a production cost, and realizing fuel consumption characteristic and power performance above an equivalent transmission.

An exemplary power transmission apparatus is for a hybrid electric vehicle having power sources of an engine and a motor-generator, and includes, an input shaft receiving a torque of the engine, a first planetary gear set having first, second, and third rotation elements and mounted on the input shaft, a second planetary gear set having fourth, fifth, and sixth rotation elements and mounted on the input shaft, a first shaft fixedly connected to the first rotation element and the motor-generator and selectively connectable to the input shaft, a second shaft fixedly connected to the second rotation element and the sixth rotation element and selectively connectable to the input shaft, a third shaft fixedly connected to the third rotation element and selectively connectable to the transmission housing, a fourth shaft fixedly connected to the fourth rotation element and selectively connectable to the transmission housing, a fifth shaft fixedly connecting the fifth rotation element and an output gear and selectively connectable to the third shaft, and a plurality of engagement elements including at least one clutch and at least one brake.

The first planetary gear set may be formed as a single pinion planetary gear set having a first sun gear as the first rotation element, a first planet carrier as the second rotation element, and a first ring gear as the third rotation element. The second planetary gear set may be formed as a single pinion planetary gear set having a second sun gear as the fourth rotation element, a second planet carrier as the fifth rotation element, and a second ring gear as the sixth rotation element.

The plurality of engagement elements may include a first clutch mounted between the first shaft and the input shaft, a second clutch mounted between the third shaft and the fifth shaft, a third clutch mounted between the second shaft and the input shaft, a first brake mounted between the fourth shaft and the transmission housing, and a second brake mounted between the third shaft and the transmission housing.

The first brake may be mounted between the second planetary gear set and the motor-generator. The second brake may be mounted radially external to the first planetary gear set.

The first brake and the second brake may be mounted between the second planetary gear set and the motor-generator.

The first planetary gear set may be formed as a double pinion planetary gear set having a first sun gear as the first rotation element, a first ring gear as the second rotation element, and a first planet carrier as the third rotation element. The second planetary gear set may be formed as a single pinion planetary gear set having a second sun gear as the fourth rotation element, a second planet carrier as the fifth rotation element, and a second ring gear as the sixth rotation element.

The plurality of engagement elements may include a first clutch mounted between the first shaft and the input shaft, a second clutch mounted between the third shaft and the fifth shaft, a third clutch mounted between the second shaft and the input shaft, a first brake mounted between the fourth shaft and the transmission housing, and a second brake mounted between the third shaft and the transmission housing.

Furthermore, a one-way clutch may be mounted between the input shaft and the engine output shaft.

According to a power transmission apparatus of a hybrid electric vehicle according to an exemplary embodiment of the present invention, while simplifying the structure of a transmission by employing only two planetary gear sets, various shifting modes, such as an engine mode and a parallel hybrid mode respectively having four shifting stages, an electronically-controlled continuously variable shifting mode (eCVT mode), and an electric vehicle mode (EV mode) having four shifting stages, may be realized, reducing a production cost, and realizing fuel consumption characteristic and power performance above an equivalent transmission.

Furthermore, the number of employed planetary gear sets may be decreased in comparison to a conventional six-speed transmission, and therefore, an overall length may be decreased, improving installability into a vehicle.

Furthermore, a one-way clutch is mounted between the input shaft and the engine output shaft, and thereby, an engine drag may be prevented in the EV mode and in regenerative braking.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

Figure 1:
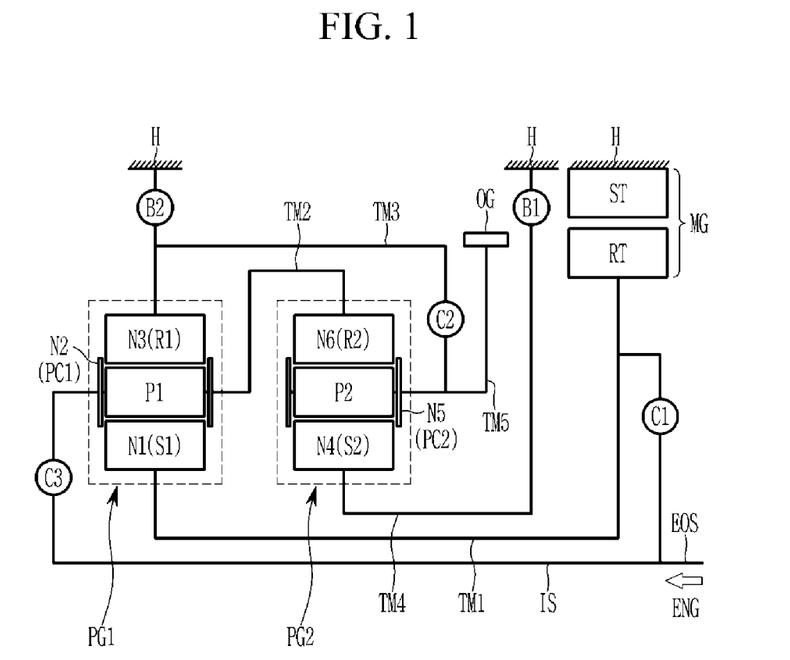
FIG. 1 is a schematic diagram of a power transmission apparatus of a hybrid electric vehicle according to various exemplary embodiments of the present invention.

FIG. 1 is a schematic diagram of a power transmission apparatus of a hybrid electric vehicle according to various exemplary embodiments of the present invention.

Referring to FIG. 1, a power transmission apparatus of a hybrid electric vehicle according to various exemplary embodiments receives torques from power sources of an engine ENG and a motor-generator MG and includes an input shaft IS, first and second planetary gear sets PG1 and PG2, five shafts TM1 to TM5 respectively connecting rotation elements of the first planetary gear set and the second planetary gear set PG1 and PG2, and engagement elements of three clutches C1 to C3 and two brakes B1 and B2.

As a result, the torques input from the engine ENG and the motor-generator MG is shifted by a cooperative operation of the first planetary gear set and the second planetary gear set PG1 and PG2, and a shifted torque is output through an output gear OG.

The engine ENG is a primary power source, and may be implemented as one of various types such as a gasoline engine or a diesel engine.

The motor-generator MG is fixedly connected to the planetary gear set portion PG and is used as an auxiliary power source.

The motor-generator MG may act as a motor and also as a generator, and includes a stator ST and a rotor RT, where the stator ST is fixed to a transmission housing H, and the rotor RT is internally mounted within the stator ST and rotatable relative to the stator ST.

The input shaft IS is an input member, and may receive the torque of the engine ENG through an engine output shaft.

The output gear OG is an output element, and may deliver a shifted torque to a driveshaft through a differential apparatus.

The first planetary gear set PG1 is a single pinion planetary gear set, and may include a first rotation element N1 of a first sun gear S1, a second rotation element N2 of a first planet carrier PC1 rotatably supporting a plurality of first pinion gears P1 externally gear-meshed with the first sun gear S1, and a third rotation element N3 of a first ring gear R1 internally gear-meshed with the plurality of first pinion gears P1.

The second planetary gear set PG2 is a single pinion planetary gear set, and includes a fourth rotation element N4 of a second sun gear S2, a fifth rotation element N5 of a second planet carrier PC2 rotatably supporting a plurality of second pinion gears P2 externally gear-meshed with the second sun gear S2, and a sixth rotation element N6 of a second ring gear R2 internally gear-meshed with the plurality of second pinion gears P2.

That is, a power transmission apparatus of a hybrid electric vehicle according to various exemplary embodiments is formed by a combination of first and second planetary gear sets PG1 and PG2, and includes five shafts TM1, TM2, TM3, TM4, and TM5.

The first to sixth rotation elements N1 to N6 are fixedly connected to a corresponding one of the shafts TM1 to TM5, and the first planetary gear set and the second planetary gear set PG1 and PG2 are operated by a plurality of engagement elements including at least one clutch and at least one brake.

The five shafts TM1 to TM5 are hereinafter described in detail.

The first shaft TM1 is fixedly connected to the first rotation element N1 (first sun gear S1) and the motor-generator MG, and while acting as an input element of the motor-generator MG, is selectively connectable to the input shaft IS, selectively acting as an input element of the engine ENG The second shaft TM2 fixedly connects the second rotation element N2 (first planet carrier PC1) and the sixth rotation element N6 (second ring gear R2), and is selectively connectable to the input shaft IS, selectively acting as an input element.

The third shaft TM3 is fixedly connected to the third rotation element N3 (first ring gear R1), and selectively connectable to the transmission housing H, selectively acting as a fixed element.

The fourth shaft TM4 is fixedly connected to the fourth rotation element N4 (second sun gear S2), and selectively connectable to the transmission housing H, selectively acting as a fixed element.

The fifth shaft TM5 is fixedly connected to the fifth rotation element N5 (second planet carrier PC2), selectively connectable to the third shaft TM3, and fixedly connected to the output gear OG, always acting as an output element.

In an exemplary embodiment of the present invention, when two or more members are described to be "fixedly connected", where each of the members may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotate separately when the engagement element is not engaged, and rotates at a same speed when the engagement element is engaged.

It may be understood that in the case that a member is "selectively connectable" to a transmission housing by an engagement element, the member may be stationary when the engagement element is engaged.

Engagement elements of first, second, and third clutches C1, C2, and C3 are mounted between a corresponding pair of the five shafts TM1 to TM5 and the input shaft, to form selective connections Engagement elements of first and second brakes B1 and B2 are mounted between the transmission housing H and a corresponding shaft of the five shafts TM1 to TM5, to form selective connections The five engagement elements of the three clutches C1, C2, and C3 and the two brakes B1 and B2 are mounted as follows.

The first clutch C1 is mounted between the first shaft TM1 and the input shaft IS, and selectively connects the first shaft TM1 and the input shaft IS, controlling power delivery therebetween.

The second clutch C2 is mounted between the third shaft TM3 and the fifth shaft TM5, and selectively connects the second shaft TM2 and the fifth shaft TM5, controlling power delivery therebetween.

The third clutch C3 is mounted between the second shaft TM2 and the input shaft IS, and selectively connects the first shaft TM1 and the input shaft IS, controlling power delivery therebetween.

The first brake B1 is mounted between the fourth shaft TM4 and the transmission housing H, and selectively connects the fourth shaft TM4 to the transmission housing H.

The second brake B2 is mounted between the third shaft TM3 and the transmission housing H, and selectively connects the third shaft TM3 to the transmission housing H.

The first brake B1 is mounted between the second planetary gear set PG2 and the motor-generator MG, and the second brake B2 is mounted radially external to the first planetary gear set PG1.

The engagement elements of the first, second, and third clutches C1, C2, and C3 and the first brake and the second brake B1 and B2 may be realized as multi-plate hydraulic pressure friction devices that are frictionally engaged by hydraulic pressure, however, it may not be understood to be limited thereto, since various other configuration that are electrically controllable may be available.

Figure 2:
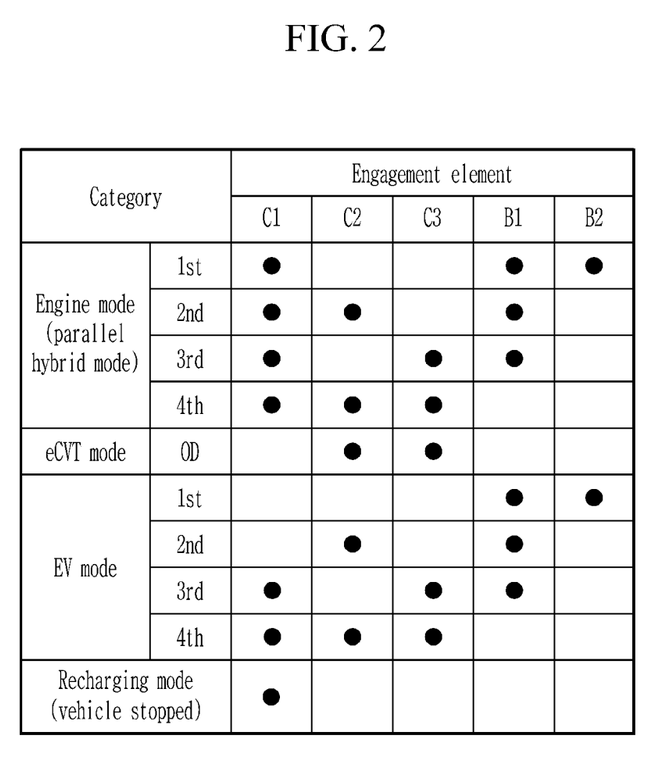
FIG. 2 is an operation chart of a power transmission apparatus of a hybrid electric vehicle according to various exemplary embodiments.

FIG. 2 is an operation chart of a power transmission apparatus of a hybrid electric vehicle according to various exemplary embodiments of FIG. 1.

Referring to FIG. 2, a power transmission apparatus of a hybrid electric vehicle according to various exemplary embodiments realizes an engine mode (hybrid mode) and an EV mode respectively having four fixed shifting stages, and also realizes an eCVT mode facilitating electronically-controlled continuously variable shifting.

In the engine mode (hybrid mode), the engine ENG is operated. In the instant state, the torque of the engine ENG is input to the first planetary gear set PG1 by operation of at least one of the first and third clutches C1 and C3, and the second clutch C2 and the first brake and the second brake B1 and B2 are controlled to realize four fixed shifting stages.

In the eCVT mode, the engine ENG is operated at a fixed rotation speed, and the third clutch C3 is engaged to transmit the torque of the engine ENG to the second shaft TM2. Simultaneously, the motor-generator MG connected to the first shaft TM1 is operated to deliver a motor torque to the first rotation element N1, and the rotation speed of the motor-generator MG is varied to vary gear ratio of the transmission to achieve gear ratios for a high gear (gear ratio below 1.0).

In the EV mode, the first clutch C1 is released to disconnect the first planetary gear set PG1 from the engine ENG and simultaneously, the torque of the motor-generator MG is transmitted to the first rotation element N1 through the first shaft TM1. Similarly to the engine mode, the second and third clutches C2 and C3 and the first brake and the second brake B1 and B2 are controlled to realize four EV fixed shifting stages.

Here, the engine mode (hybrid mode) and the eCVT mode may be combined to realize a shifting mode of at least five speeds.

That is, while maintaining the sift-stages of first forward speed to fourth forward speed in the engine mode, an overdrive OD may be realized by the eCVT mode performing electronically-controlled continuously variable shifting to realize a gear ratio appropriate for a high gear.

Hereinafter, an operation of a power transmission apparatus of a hybrid electric vehicle according to various exemplary embodiments is described in detail in connection with respective modes.

[Engine Mode First Forward Speed (Hybrid Mode First Forward Speed)]

In an engine mode first forward speed, the engine ENG is operated, and the first clutch C1 and the first brake and the second brake B1 and B2 are simultaneously operated.

Accordingly, the fourth shaft TM4 acts as a fixed element by the operation of first brake B1, and the third shaft TM3 acts as a fixed element by the operation of second brake B2. In the instant state, by the operation of the first clutch C1, the torque of the engine ENG is input to the first rotation element N1 through the first shaft TM1.

As a result, a reduced speed output is delivered to the fifth rotation element N5 of the first planetary gear set and the second planetary gear set PG1 and PG2, and the torque of the engine mode first forward speed is output through the output gear OG connected to the fifth rotation element N5 through the fifth shaft TM5.

Here, when the motor-generator MG is driven, the torque of the motor-generator MG is added to the first shaft TM1, and therefore, a hybrid mode first forward speed may be realized.

[Engine Mode Second Forward Speed (Hybrid Mode Second Forward Speed)]

In an engine mode second forward speed, the engine ENG is operated, and the first clutch and second clutch C1 and C2 and the first brake B1 are simultaneously operated.

Accordingly, the fourth shaft TM4 acts as a fixed element by the operation of first brake B1. In the instant state, the third shaft TM3 and the fifth shaft TM5 are interconnected by the operation of the second clutch C2, and by the operation of the first clutch C1, the torque of the engine ENG is input to the first rotation element N1 through the first shaft TM1.

As a result, a reduced speed output is delivered to the fifth rotation element N5 of the first planetary gear set and the second planetary gear set PG1 and PG2, and the torque of the engine mode second forward speed is output through the output gear OG connected to the fifth rotation element N5 through the fifth shaft TM5.

Here, when the motor-generator MG is driven, the torque of the motor-generator MG is added to the first shaft TM1, and therefore, a hybrid mode second forward speed may be realized.

[Engine Mode Third Forward Speed (Hybrid Mode Third Forward Speed)]

In an engine mode third forward speed, the engine ENG is operated, and the first and the third clutch C1 and C3, first brake B1 are simultaneously operated.

Accordingly, the fourth shaft TM4 acts as a fixed element by the operation of first brake B1. In the instant state, by the operation of the first and third clutches C1 and C3, the torque of the engine ENG is input to the first rotation element N1 through the first shaft TM1, and is input to the second and sixth rotation elements N2 and N6 through the second shaft TM2.

As a result, a reduced speed output is delivered to the fifth rotation element N5 of the first planetary gear set and the second planetary gear set PG1 and PG2, and the torque of the engine mode third forward speed is output through the output gear OG connected to the fifth rotation element N5 through the fifth shaft TM5.

Here, when the motor-generator MG is driven, the torque of the motor-generator MG is added to the first shaft TM1, and therefore, a hybrid mode third forward speed may be realized.

[Engine Mode Fourth Forward Speed (Hybrid Mode Fourth Forward Speed)]

In an engine mode fourth forward speed, the engine ENG is operated, and the first and the second and third clutches C1, C2, and C3 are simultaneously operated.

Accordingly, the third shaft TM3 and the fifth shaft TM5 are interconnected by the operation of the second clutch C2, and the torque of the engine ENG is simultaneously input to the first shaft TM1 and the second shaft TM2 by the operation of the first and third clutches C1 and C3. Therefore, the first planetary gear set and the second planetary gear set PG1 and PG2 integrally rotates.

As a result, in the first planetary gear set and the second planetary gear set PG1 and PG2, an input torque is directly output (at a ratio of 1:1) through the output gear OG connected to the fifth rotation element N5 through the fifth shaft TM5, outputting a torque of engine mode fourth forward speed.

Here, when the motor-generator MG is driven, the torque of the motor-generator MG is added to the first shaft TM1, and therefore, a hybrid mode fourth forward speed may be realized.

In such an engine mode, while a vehicle is stopped with the engine ENG running, the first clutch C1 may be operated to transmit the torque of the engine ENG to the motor-generator MG to generate electricity to recharge a battery.

[eCVT Mode]

In the eCVT mode, the engine ENG is operated at a fixed rotation speed, and the second and third clutches C2 and C3 are operated.

Accordingly, the third shaft TM3 and the fifth shaft TM5 are interconnected by the operation of the second clutch C2, the third clutch C3 is operated to transmit the torque of the engine ENG to the second shaft TM2, and simultaneously, the torque of the motor-generator MG connected to the first shaft TM1 is transmitted to the first rotation element N1.

In such a state, an eCVT mode having gear ratios appropriate for a high gear may be realized by varying the rotation speed of the motor-generator MG

[EV Mode First Speed]

In an EV mode first speed, the first clutch C1 is released to disconnect the engine ENG In the instant state, the first brake and the second brake B1 and B2 are simultaneous operated, and the motor-generator MG is operated.

Accordingly, the fourth shaft TM4 and the third shaft TM3 act as fixed elements by the operation of the first brake and the second brake B1 and B2. In the instant state, the torque of the motor-generator MG is input to the first rotation element N1 through the first shaft TM1.

As a result, a reduced speed output is delivered to the fifth rotation element N5 of the first planetary gear set and the second planetary gear set PG1 and PG2, and the torque of the EV mode first speed is output through the output gear OG connected to the fifth rotation element N5 through the fifth shaft TM5.

[EV Mode Second Speed]

In an EV mode second speed, the first clutch C1 is released to disconnect the engine ENG In the instant state, the second clutch C2 and the first brake B1 are simultaneous operated and the motor-generator MG is operated.

Accordingly, the third shaft TM3 and the fifth shaft TM5 are interconnected by the operation of the second clutch C2, and the fourth shaft TM4 acts as a fixed element by the operation of first brake B1. In the instant state, the torque of the motor-generator MG is input to the first rotation element N1 through the first shaft TM1.

As a result, a reduced speed output is delivered to the fifth rotation element N5 of the first planetary gear set and the second planetary gear set PG1 and PG2, and the torque of the EV mode second speed is output through the output gear OG connected to the fifth rotation element N5 through the fifth shaft TM5.

[EV Mode Third Speed]

In an EV mode third speed, the first clutch C1, the third clutch C3, and the first brake B1 are simultaneous operated and the motor-generator MG is operated.

Accordingly, the first shaft TM1 and the second shaft TM2 are interconnected by the operation of the first clutch C1 and the third clutch C3, and the fourth shaft TM4 acts as a fixed element by the operation of first brake B1. In the instant state, the torque of the motor-generator MG is input to the first rotation element N1 through the first shaft TM1 and to the second rotation element N2 through the input shaft IS and the second shaft TM2.

As a result, the first planetary gear set PG1 integrally rotates and a reduced speed is output at the fifth rotation element N5 of the second planetary gear set PG2. Accordingly, the torque of the EV mode third speed is output through the output gear OG connected to the fifth rotation element N5 through the fifth shaft TM5.

[EV Mode Fourth Speed]

In an EV mode fourth speed, the first, second, and third clutches C1, C2, and C3 are simultaneous operated, and the motor-generator MG is operated.

Accordingly, the first planetary gear set PG1 integrally rotates by the operation of the first and third clutches C1 and C3, and the second planetary gear set PG2 integrally rotates by the operation of the second clutch C2, since the torque of the motor-generator MG is simultaneously input to the fifth and sixth rotation elements N5 and N6. Therefore, the first planetary gear set and the second planetary gear set PG1 and PG2 integrally rotates.

As a result, in the first planetary gear set and the second planetary gear set PG1 and PG2, an input torque is directly output (at a ratio of 1:1) through the output gear OG connected to the fifth rotation element N5 through the fifth shaft TM5, outputting a torque of EV mode fourth speed.

Figure 3:
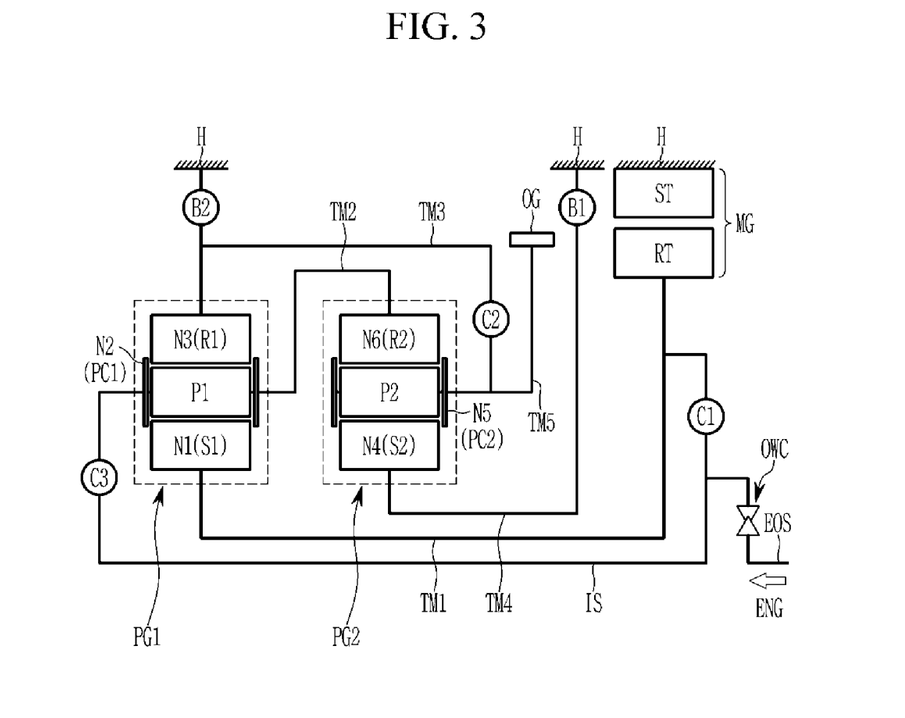
FIG. 3 is a schematic diagram of a power transmission apparatus of a hybrid electric vehicle according to various exemplary embodiments of the present invention.
Figure 4:
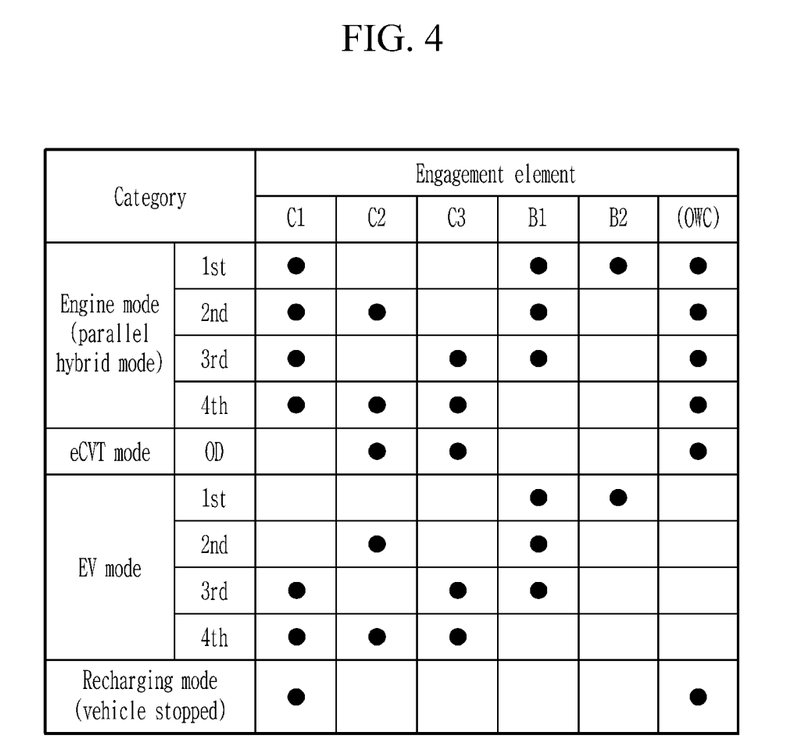
FIG. 4 is an operation chart of a power transmission apparatus of a hybrid electric vehicle according to various exemplary embodiments.

FIG. 3 is a schematic diagram of a power transmission apparatus of a hybrid electric vehicle according to various exemplary embodiments. FIG. 4 is an operation chart of a power transmission apparatus of a hybrid electric vehicle according to various exemplary embodiments.

Referring to FIG. 3, a power transmission apparatus of a hybrid electric vehicle according to various exemplary embodiments in FIG. 3 differ from the various exemplary embodiments in FIG. 1 in that a one-way clutch OWC is applied between the input shaft IS and the engine output shaft EOS.

Since the one-way clutch OWC is mounted between the input shaft IS and the engine output shaft EOS, an engine drag may be prevented in the EV mode and in regenerative braking.

As a result, a power transmission apparatus of a hybrid electric vehicle according to various exemplary embodiments merely differ from the various exemplary embodiments in the feature of employing the one-way clutch, and other arrangement remains the same, which is not further described in detail.

Furthermore, referring to FIG. 4, shifting modes may be realized in the same way as in the various exemplary embodiments in FIG. 1 except for only the operation of the one-way clutch OWC, and therefore shifting operation is not further described in detail.

Figure 5:
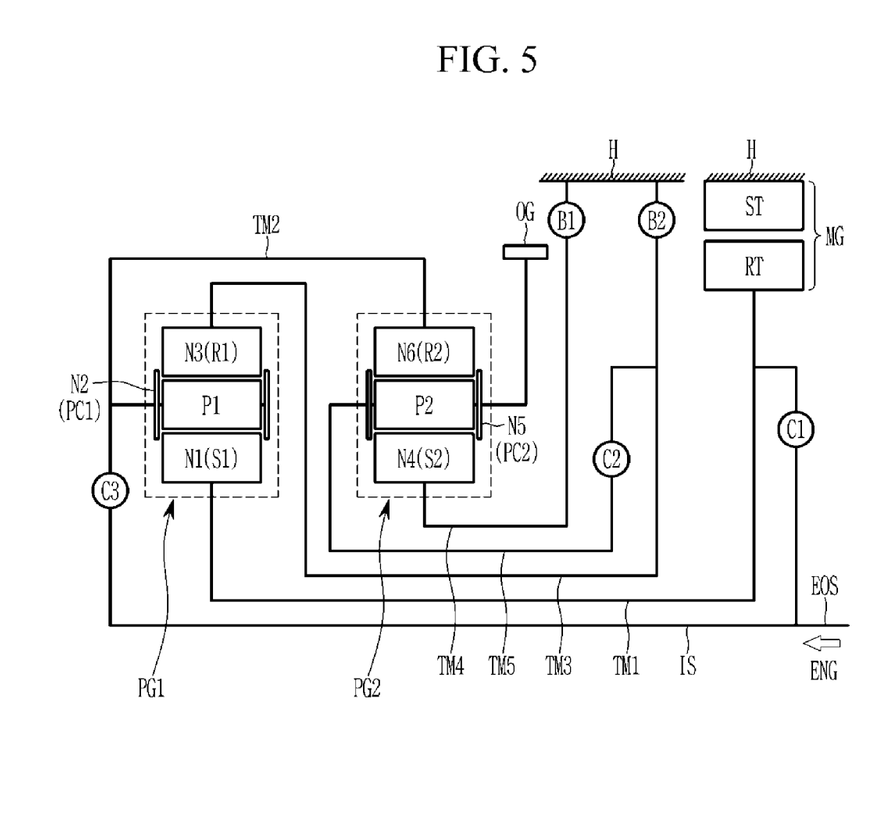
FIG. 5 is a schematic diagram of a power transmission apparatus of a hybrid electric vehicle according to various exemplary embodiments of the present invention.

FIG. 5 is a schematic diagram of a power transmission apparatus of a hybrid electric vehicle according to various exemplary embodiments of the present invention.

Referring to FIG. 5, a power transmission apparatus of a hybrid electric vehicle according to various exemplary embodiments differ from the various exemplary embodiments in FIG. 1 in the locations of the first brake and the second brake B1 and B2.

That is, in the various exemplary embodiments of the present invention in FIG. 1, the first brake B1 is located between the second planetary gear set PG2 and the motor-generator MG and the second brake B2 is located radially external to the first planetary gear set PG1. However, in the various exemplary embodiments of the present invention of FIG. 5, the first brake and the second brake B1 and B2 are located between the second planetary gear set PG2 and the motor-generator MG.

As a result, a power transmission apparatus of a hybrid electric vehicle according to various exemplary embodiments of FIG. 5 merely differ from the various exemplary embodiments of FIG. 1 in the locations of the first brake and the second brake B1 and B2, and other arrangement remains the same, which is not further described in detail.

Furthermore, shifting modes may be realized in the same way as in the various exemplary embodiments of the present invention in FIG. 1, and therefore shifting operation is not further described in detail.

Figure 6:
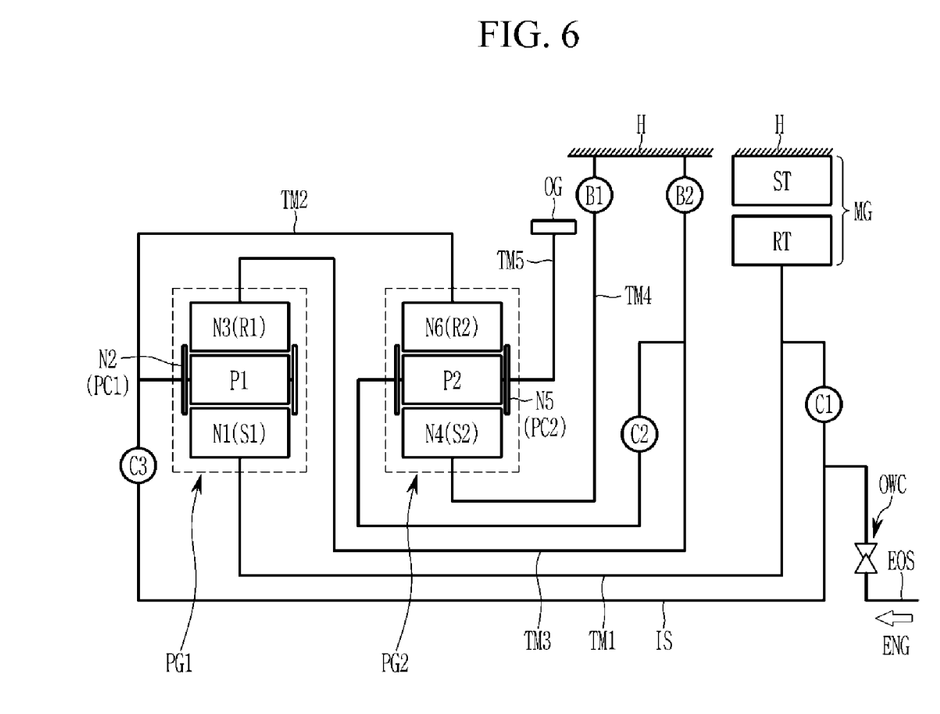
FIG. 6 is a schematic diagram of a power transmission apparatus of a hybrid electric vehicle according to various exemplary embodiments of the present invention.

FIG. 6 is a schematic diagram of a power transmission apparatus of a hybrid electric vehicle according to various exemplary embodiments of the present invention.

Referring to FIG. 6, a power transmission apparatus of a hybrid electric vehicle according to various exemplary embodiments differ from the various exemplary embodiments in FIG. 5 in that a one-way clutch OWC is applied between the input shaft IS and the engine output shaft EOS.

Since the one-way clutch OWC is mounted between the input shaft IS and the engine output shaft EOS, an engine drag may be prevented in the EV mode and in regenerative braking.

As a result, a power transmission apparatus of a hybrid electric vehicle according to various exemplary embodiments of FIG. 6 merely differ from the various exemplary embodiments in FIG. 5 in the feature of employing the one-way clutch, and other arrangement remains the same, which is not further described in detail.

Furthermore, shifting modes may be realized in the same way as in the various exemplary embodiments of FIG. 3 except for only the operation of the one-way clutch OWC, while others remain the same, and therefore shifting operation is not further described in detail.

Figure 7:
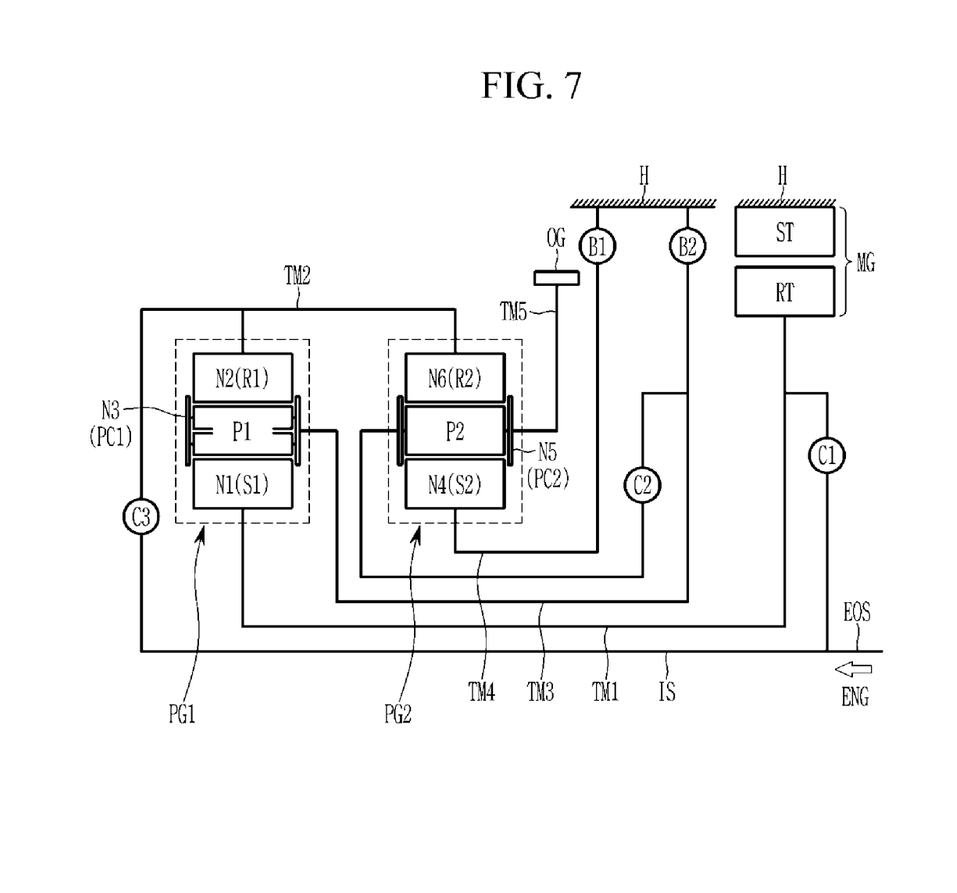
FIG. 7 is a schematic diagram of a power transmission apparatus of a hybrid electric vehicle according to various exemplary embodiments of the present invention.

FIG. 7 is a schematic diagram of a power transmission apparatus of a hybrid electric vehicle according to various exemplary embodiments of the present invention.

Referring to FIG. 7, a power transmission apparatus of a hybrid electric vehicle according to various exemplary embodiments differs from the various exemplary embodiments in FIG. 5 in an arrangement of the first planetary gear set PG1.

That is, in the various exemplary embodiments of the present invention in FIG. 5, the first planetary gear set PG1 is formed as a single pinion planetary gear set. However, in the various exemplary embodiments of the present invention in FIG. 7, the first planetary gear set PG1 is formed as a double pinion planetary gear set.

That is, the first planetary gear set PG1 of various exemplary embodiments in FIG. 7 is a double pinion planetary gear set, and includes a first rotation element N1 of a first sun gear S1, a second rotation element N2 of a first ring gear R1 internally gear-meshed with a plurality of first pinion gears P1 that are externally gear-meshed with the first sun gear S1, and a third rotation element N3 of a first planet carrier PC1 rotatably supporting the plurality of first pinion gears P1.

As a result, a power transmission apparatus of a hybrid electric vehicle according to various exemplary embodiments in FIG. 7 merely differ from the various exemplary embodiments in FIG. 5 in employing a different type of the first planetary gear set PG1, and other arrangement remains the same, which is not further described in detail.

Furthermore, shifting modes may be realized in the same way as in the various exemplary embodiments of the present invention in FIG. 1, and therefore shifting operation is not further described in detail.

Figure 8:
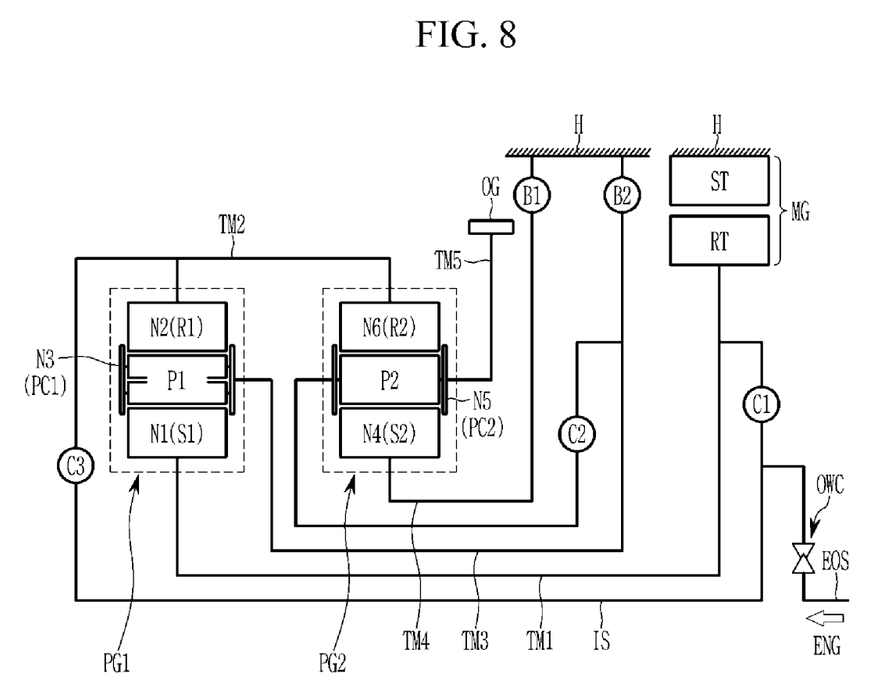
FIG. 8 is a schematic diagram of a power transmission apparatus of a hybrid electric vehicle according to various exemplary embodiments of the present invention.

FIG. 8 is a schematic diagram of a power transmission apparatus of a hybrid electric vehicle according to various exemplary embodiments of the present invention.

Referring to FIG. 8, a power transmission apparatus of a hybrid electric vehicle according to various exemplary embodiments differs from the various exemplary embodiments in FIG. 7 in that a one-way clutch OWC is applied between the input shaft IS and the engine output shaft EOS.

Since the one-way clutch OWC is mounted between the input shaft IS and the engine output shaft EOS, an engine drag may be prevented in the EV mode and in regenerative braking.

As a result, a power transmission apparatus of a hybrid electric vehicle according to various exemplary embodiments in FIG. 8 merely differ from the various exemplary embodiments in FIG. 7 in the feature of employing the one-way clutch, and other arrangement remains the same, which is not further described in detail.

Furthermore, shifting modes may be realized in the same way as in the various exemplary embodiments in FIG. 3 except for only the operation of the one-way clutch OWC, and therefore shifting operation is not further described in detail.

As described above, a power transmission apparatus of a hybrid electric vehicle according to exemplary embodiments employs only two planetary gear sets PG1 and PG2, simplifying the structure of a transmission. Furthermore, an engine mode and a parallel hybrid mode respectively having six speeds and an electronically-controlled continuously variable shifting mode (eCVT mode) may be combined to realize various shifting modes having more than four speeds, reducing a production cost, and realizing fuel consumption characteristic and power performance above an equivalent transmission.

Furthermore, the number of employed planetary gear sets may be decreased in comparison to a conventional six-speed transmission, and therefore, an overall length may be decreased, improving installability.

Furthermore, a one-way clutch OWC is applied between the input shaft IS and the engine output shaft EOS, and thereby, an engine drag may be prevented in the EV mode and in regenerative braking.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus of a vehicle having power sources of an engine and a motor-generator, the power transmission apparatus comprising:
an input shaft receiving a torque of the engine;
a first planetary gear set having a first rotation element, a second rotation element, and a third rotation element and mounted on the input shaft;
a second planetary gear set having a fourth rotation element, a fifth rotation element, and a sixth rotation element and mounted on the input shaft;
a first shaft fixedly connected to the first rotation element and the motor-generator and selectively connectable to the input shaft by a first engagement element among a plurality of engagement elements;
a second shaft fixedly connected to the second rotation element and the sixth rotation element and selectively connectable to the input shaft by a second engagement element among the plurality of engagement elements;
a third shaft fixedly connected to the third rotation element and selectively connectable to a transmission housing by a third engagement element among the plurality of engagement elements;
a fourth shaft fixedly connected to the fourth rotation element and selectively connectable to the transmission housing by a fourth engagement element among the plurality of engagement elements; and
a fifth shaft fixedly connecting the fifth rotation element and an output gear and selectively connectable to the third shaft by a fifth engagement element among the plurality of engagement elements,
wherein the plurality of engagement elements includes at least one clutch and at least one brake, as the first to fifth engagement elements.

2. The power transmission apparatus of claim 1,
wherein the first planetary gear set is formed as a single pinion planetary gear set having a first sun gear as the first rotation element, a first planet carrier as the second rotation element, and a first ring gear as the third rotation element;
wherein the second planetary gear set is formed as a single pinion planetary gear set having a second sun gear as the fourth rotation element, a second planet carrier as the fifth rotation element, and a second ring gear as the sixth rotation element.

3. The power transmission apparatus of claim 2,
wherein the at least one clutch of the plurality of engagement elements include:
a first clutch, as the first engagement element, mounted between the first shaft and the input shaft;
a second clutch, as the fifth engagement element, mounted between the third shaft and the fifth shaft; and
a third clutch, as the second engagement element, mounted between the second shaft and the input shaft, and wherein the at least one brake of the plurality of engagement elements include:
a first brake, as the fourth engagement element, mounted between the fourth shaft and the transmission housing; and
a second brake, as the third engagement element, mounted between the third shaft and the transmission housing.

4. The power transmission apparatus of claim 3,
wherein the first brake is mounted between the second planetary gear set and the motor-generator,
wherein the second brake is mounted outside of the first planetary gear set.

5. The power transmission apparatus of claim 4, further including a one-way clutch mounted between the input shaft and an engine output shaft.

6. The power transmission apparatus of claim 3, wherein the first brake and the second brake are mounted between the second planetary gear set and the motor-generator.

7. The power transmission apparatus of claim 6, further including a one-way clutch mounted between the input shaft and an engine output shaft.

8. The power transmission apparatus of claim 1,
wherein the first planetary gear set is formed as a double pinion planetary gear set having a first sun gear as the first rotation element, a first ring gear as the second rotation element, and a first planet carrier as the third rotation element;
wherein the second planetary gear set is formed as a single pinion planetary gear set having a second sun gear as the fourth rotation element, a second planet carrier as the fifth rotation element, and a second ring gear as the sixth rotation element.

9. The power transmission apparatus of claim 8,
wherein the at least one clutch of the plurality of engagement elements include:
a first clutch, as the first engagement element, mounted between the first shaft and the input shaft;
a second clutch, as the fifth engagement element, mounted between the third shaft and the fifth shaft; and
a third clutch, as the second engagement element, mounted between the second shaft and the input shaft;
wherein the at least one brake of the plurality of engagement elements include:
a first brake, as the fourth engagement element, mounted between the fourth shaft and the transmission housing; and
a second brake, as the third engagement element, mounted between the third shaft and the transmission housing.

10. The power transmission apparatus of claim 9, wherein the first brake and the second brake are mounted between the second planetary gear set and the motor-generator.

11. The power transmission apparatus of claim 10, further including a one-way clutch mounted between the input shaft and an engine output shaft.

* * * * *